(12) United States Patent
Liang

(10) Patent No.: US 9,215,482 B2
(45) Date of Patent: Dec. 15, 2015

(54) METHOD AND APPARATUS FOR RETRIEVING I FRAME

(75) Inventor: Xian Liang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 444 days.

(21) Appl. No.: 13/395,243

(22) PCT Filed: Apr. 23, 2010

(86) PCT No.: PCT/CN2010/072141
§ 371 (c)(1),
(2), (4) Date: Mar. 9, 2012

(87) PCT Pub. No.: WO2011/029304
PCT Pub. Date: Mar. 17, 2011

(65) Prior Publication Data
US 2012/0174168 A1    Jul. 5, 2012

(30) Foreign Application Priority Data

Sep. 10, 2009    (CN) .......................... 2009 1 0172132

(51) Int. Cl.
*H04N 21/44* (2011.01)
*H04N 21/234* (2011.01)
(Continued)

(52) U.S. Cl.
CPC ........... *H04N 21/2389* (2013.01); *H04N 19/48* (2014.11); *H04N 19/61* (2014.11);
(Continued)

(58) Field of Classification Search
CPC .............. H04N 21/00; H04N 13/0066; H04N 19/00218; H04N 21/44008; H04N 21/23418; H04N 21/2387

USPC ................... 725/86–88, 90, 93; 386/343, 350
See application file for complete search history.

(56) References Cited

U.S. PATENT DOCUMENTS

2004/0109671 A1* 6/2004 Kuno et al. ..................... 386/68
2004/0190631 A1   9/2004 Hulmani et al.
(Continued)

FOREIGN PATENT DOCUMENTS

| CN | 1264120 A | 8/2000 |
|----|-----------|--------|
| CN | 1595992 A | 3/2005 |

(Continued)

OTHER PUBLICATIONS

Andrew S. Tanenbaum, "Structured Computer Organization", 1984, 2nd Ed., pp. 10-12.*

(Continued)

*Primary Examiner* — Benjamin R Bruckart
*Assistant Examiner* — Jason Thomas
(74) *Attorney, Agent, or Firm* — Ling Wu; Stephen Yang; Ling and Yang Intellectual Property

(57) ABSTRACT

A method and apparatus for retrieving an I frame are disclosed in the present invention, wherein, the method includes: analyzing transport stream packets in a transport stream one by one, and if it is determined that the current transport stream packet is a video packet and includes a Packet Elementary Stream (PES) header, then making a determination according to data after the PES header in the current transport stream packet to locate initial and/or end locations of the I frame. In the present invention, without parsing syntax elements in H.264, such as a Sequence Parameter Set (SPS), a Picture Parameter Set (PPS), a slice etc., the location of the I frame can be positioned by simply comparing various Transport stream (TS) packets in the TS stream and making a determination.

12 Claims, 2 Drawing Sheets

(51) Int. Cl.
  *H04N 21/2387* (2011.01)
  *H04N 21/845* (2011.01)
  *H04N 21/2389* (2011.01)
  *H04N 21/4385* (2011.01)
  *H04N 19/61* (2014.01)
  *H04N 19/48* (2014.01)

(52) U.S. Cl.
  CPC ..... *H04N21/2387* (2013.01); *H04N 21/23418* (2013.01); *H04N 21/4385* (2013.01); *H04N 21/44008* (2013.01); *H04N 21/8451* (2013.01); *H04N 21/8453* (2013.01); *H04N 21/8455* (2013.01)

(56) References Cited

U.S. PATENT DOCUMENTS

2005/0169303 A1* 8/2005 Toma et al. ............ 370/466
2007/0189732 A1 8/2007 Pothana et al.
2008/0181314 A1* 7/2008 Tsuda et al. ............ 375/240.28
2009/0225983 A1* 9/2009 Reinoso et al. ............ 380/212

FOREIGN PATENT DOCUMENTS

| | | |
|---|---|---|
| CN | 101651833 A | 2/2010 |
| EP | 1746836 A2 | 1/2007 |
| JP | 2006319885 A | 11/2006 |

OTHER PUBLICATIONS

International Search Report for PCT/CN2010/072141 dated Jul. 8, 2010.

* cited by examiner

METHOD AND APPARATUS FOR RETRIEVING I FRAME

TECHNICAL FIELD

The present invention relates to the field of a multimedia technology, and in particular, to a method and an apparatus for retrieving I frame.

BACKGROUND OF THE RELATED ART

Internet Protocol Television (IPTV) services refer to a general term of services which provide television program broadcast, video on demand, time-shift playing, and other various application services and support interaction capacities to users through an Internet Protocol (IP) bearer network. An IPTV system at least comprises devices such as a server, a network, a set-top box, a television etc., and when the IPTV system is in use, the server transmits multimedia data to the set-top box over the network, and set-top box decodes the data and outputs the decoded data to the television for playing.

Applications such as video on demand, time-shift playing etc. in the IPTV services need to use a technology of retrieving an I frame, to facilitate users to perform operations such as positioning playing, fast forward and backward etc. For example, in the positioning playing, it is needed to skip to an I frame closest to a positioning time point for playing. Because data before the I frame cannot be correctly decoded, if the data are transmitted to the decoder, it is not only a waste of bandwidth and time, but also the data cannot be decoded. Therefore, how to quickly and accurately position the closest I frame is critical. For another example, in the fast forward and backward, due to limitation of the network bandwidth, in order to quickly respond to the fast forward and backward operation of users, all the data transmitted by the server to the set-top box are I frame data, and therefore, when providing the fast forward and backward function, the server needs to accurately know a specific location of the I frame in advance.

In summary, for various service applications, regardless of the server or the set-top box, the I frame needs to be retrieved quickly and the location of the I frame needs to be positioned accurately and timely in a certain application scene. At present, a video compression algorithm used in the IPTV services is typically the H.264 protocol, and a mode of a Transport Stream (TS) is used for packaging. When the I frame is retrieved from the TS stream, it is needed to analyze the syntax of the TS stream, i.e., analyzing the syntax of the H.264 in code streams, to determine initial and end locations of the I-frame. When bit streams of the H.264 protocol are analyzed, it is needed at least to parse semantics of a Sequence Parameter Set (SPS), a Picture Parameter Set (PPS) and a slice, and therefore, a certain memory space and CPU resources need to be consumed, and additional consumption will also be added in time, which will influence the speed to position the I frame.

SUMMARY OF THE INVENTION

The technical problem to be solved by the present invention is to provide a method and apparatus for retrieving I frame, which are used to quickly and accurately find initial and end locations of the I frame, thus implementing retrieving and positioning of the I frame.

In order to solve the above technical problem, the present invention provides a method for retrieving I frame, comprising:

analyzing transport stream packets in a transport stream one by one, and if a current transport stream packet is determined to be a video packet and comprise a Packet Elementary Stream (PES) header, making a determination according to data after the PES header in the current transport stream packet to position initial location and/or end location of the I frame.

Preferably, in the step of determining that the current transport stream packet is a video packet, it is determined whether a packet identifier of the current transport stream packet is a video packet identifier in the transport stream, and if so, it is determined that the current transport stream packet is the video packet.

Preferably, in the step of determining that the current transport stream packet comprises a PES header, it is determined whether first three bytes of payload of the current transport stream packet are initial codes of the PES, and if so, it is determined that the current transport stream packet comprises a PES header.

Preferably, in the step of making a determination according to data after the PES header to position an initial location of the I frame, if it is determined that bytes after the PES header in the current transport stream packet comprise initial codes of a Sequence Parameter Set (SPS) or a Picture Parameter Set (PPS), the current transport stream packet is determined to be the initial location of the I frame.

Preferably, in the step of making a determination according to data after the PES header to position an end location of the I frame, if it is determined that bytes after the PES header in the current transport stream packet comprise slice information and it is determined that an initial identification element in the slice information is identified as initial data of a present frame image, a previous transport stream packet of the current transport stream packet is determined to be the end location of the I frame.

Preferably, in the step of determining that bytes after the PES header in the current transport stream packet comprise slice information, it is determined whether a type of a current network abstraction level is one of a slice of an instantaneous decoder refresh image, a slice of a non-instantaneous decoder refresh image, a SPS and a PPS in the data after the PES header, and if so, it is determined that the data packet after the PES header comprises the slice information.

In order to solve the above technical problem, the present invention provides a retrieval apparatus for retrieving an I frame, comprising: a transport stream packet parsing module, a PES packet analyzing module, a retrieval control module, an initial location searching module, an end location searching module, and a slice parsing module, wherein, the transport stream packet parsing module is configured to obtain transport stream packets in a transport stream, analyze transport stream packets one by one, and determine whether the current transport stream packet is a video packet, and if so, transmit the current transport stream packet to the PES packet analyzing module for processing;

the PES packet analyzing module is configured to determine whether the transport stream packet comprises a PES header, and if so, hand over the transport stream packet to the retrieval control module for processing;

the retrieval control module is configured to deliver the transport stream packet to the initial location searching module for processing if it is determined that an initial location of the I frame needs to be searched for; and deliver the transport stream packet to the end location searching module for processing if it is determined that an end location of the I frame needs to be searched for;

the initial location searching module is configured to determine whether bytes after the PES header comprise initial codes of a SPS or a PPS, and if so, determine that the current transport stream packet is the initial location of the I frame, and notify the transport stream packet parsing module to continue to obtain the next transport stream packet for processing; and the end location searching module is configured to determine whether bytes after the PES header comprise slice information, and if so, hand over to the slice parsing module to determine whether an initial identification element in the slice information is identified initial data of the present frame image, and if it is the initial data, determine that the previous transport stream packet is the end location of the I frame, and notify the transport stream packet parsing module to continue to obtain the next transport stream packet for processing after determining the end location.

Preferably, the transport stream packet parsing module is further configured to determine whether the packet identifier of the current transport stream packet is a video packet identifier in the transport stream, and if so, determine that the transport stream packet is a video packet.

Preferably, the PES packet analyzing module is further configured to determine whether first three bytes of payload of the current transport stream packet are initial codes of the PES when the transport stream packet is a video packet, and if so, determine that the transport stream packet comprises a PES header.

Preferably, the end location searching module is further configured to determine whether a type of a current network abstraction level is one of a slice of an instantaneous decoder refresh image, a slice of a non-instantaneous decoder refresh image, a SPS and a PPS in data after the PES header in the current transport stream packet, and if so, determine that the data after the PES header comprises the slice information.

Preferably, the retrieval apparatus further comprises a cache module, the cache module is configured to cache received transport stream packets in the transport stream for the transport stream packet parsing module to obtain the transport stream packets.

The method and apparatus for retrieving an I frame according to the present invention need not to parse syntax elements such as SPS, PPS, slice etc. in the H.264 when the I frame is retrieved, but can position the location of the I frame by simply comparing various TS packets in the TS stream and making a determination, thus being able to find the initial and end locations of the I frame and being able to implement retrieving and locating of the I frame quickly and accurately to provide a rapid response for user-related service applications.

PREFERRED EMBODIMENTS OF THE PRESENT INVENTION

In order to make purposes, technical schemes and advantages of the present invention more clear, the present invention will be described in further detail in conjunction with accompanying drawings.

The present invention relates to a technology of retrieving I frame of the H.264 TS streams in the field of IPTV. In an IPTV system, there will be a SPS and a PPS before each I frame, and they will then be marked with a PES header to be encapsulated in a TS packet. The present invention only needs to analyze the syntax of the TS stream, simply compare the TS packets and make a determination according to comparison of data after the PES packet header to be able to position initial and end locations of an I frame accurately by providing a method and an apparatus for retrieving the I frame efficiently and quickly, thus being able to save a memory space and CPU resources, and being much easier to implement on an embedded device. The present invention needs not to parse syntax elements such as SPS, PPS and slice etc. in the H.264, and can position the location of I frame by simple comparison and determination, which has advantages such as being quick, simple and accurate etc.

Figure 1:
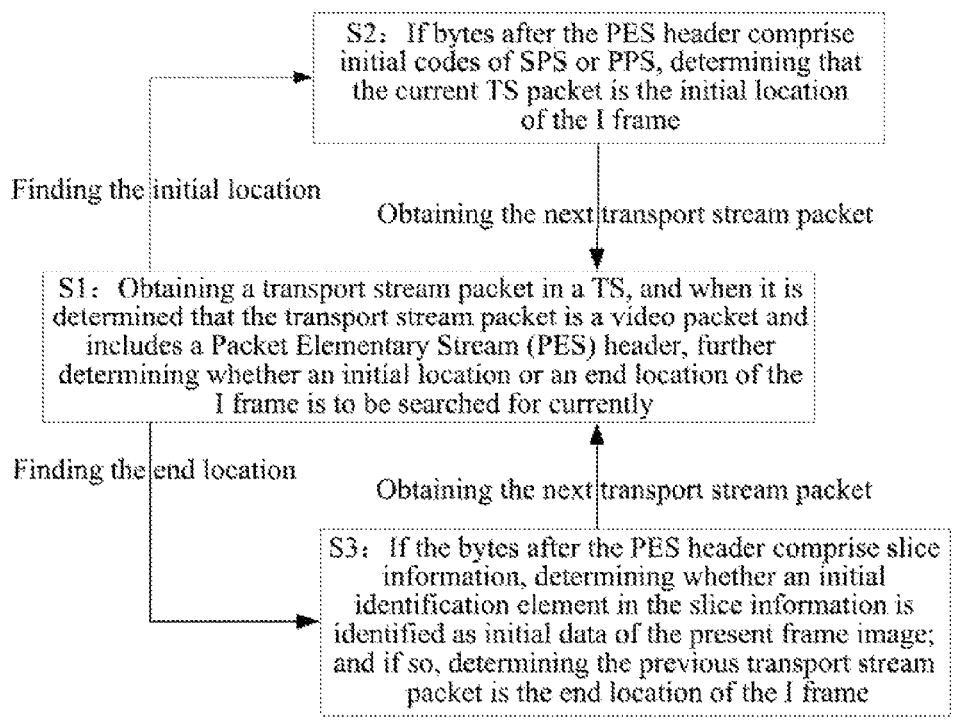
FIG. 1 is a flowchart of implementing a method for retrieving I frame according to the present invention.

Based on the above idea, a method for retrieving I frame according to the present invention, as shown in FIG. 1, comprises the following steps.

In S1, a TS packet in a TS is obtained, and when it is determined that the TS packet is a video packet and includes a PES header, it is further determined whether an initial location or an end location of the I frame is to be searched for currently, and if the initial location is to be searched for, go to Step S2, and if the end location is to be searched for, go to Step S3.

In S2, if bytes after the PES header comprise initial codes of SPS or PPS, it is determined that the current TS packet is the initial location of an I frame, and return to Step S1 to continue to obtain the next TS packet for processing.

In S3, if the bytes after the PES header comprise slice information, whether an initial identification element in the slice information is identified as initial data of the present frame image is determined, and if so, the previous TS packet is determined to be the end location of the I frame, and after the determination, return to step S1 to continue to obtain the next TS packet for processing.

In Step S1, if the TS packet is not a video packet, the next TS packet in the TS is directly obtained for processing. During the determination, if a Packet Identifier (PID) of the current TS packet is a video PID in the TS stream, it is illustrated that the TS packet is a video packet; and if it is a video packet but no PES header is comprised, the next TS packet in the TS stream is directly obtained for processing, wherein, if the first three bytes of payload of the current TS packet are initial codes 0x000001 of the PES, it can be determined that the TS packet comprises PES header information; otherwise, the TS packet does not comprise PES header information.

In Step S2, if the TS packet does not comprise initial codes of the SPS/PPS parameter sets, it is illustrated that the TS packet does not have initial data of the I frame, and return to Step S1 directly to continue to analyze the next TS packet.

In Step S3, if a current type of a Network Abstraction Level (NAL) is one of a slice of an Instantaneous Decoder Refresh (IDR) image, a slice of a non-IDR image, a SPS, a PPS in the data after the PES header, it is illustrated that the data after the NAL is the slice header information; otherwise, return to Step S1 to continue to analyze the next TS packet.

Wherein, the initial identification element in the slice information is a first_mb_in_slice syntax element of the current slice information, and whether a value of the first_mb_in_slice syntax element is zero is determined, and if so, it is illustrated that a first macro block of the slice is a first macro block of the present frame image, which further illustrates that the slice is initial data of the present frame image, i.e., an initial location of a new frame is found, and then the previous TS packet can be determined to be the end location of the I frame. If the value of the syntax element first_mb_in_slice is not zero, return to Step S1 directly to continue to analyze the next TS packet.

Figure 2:
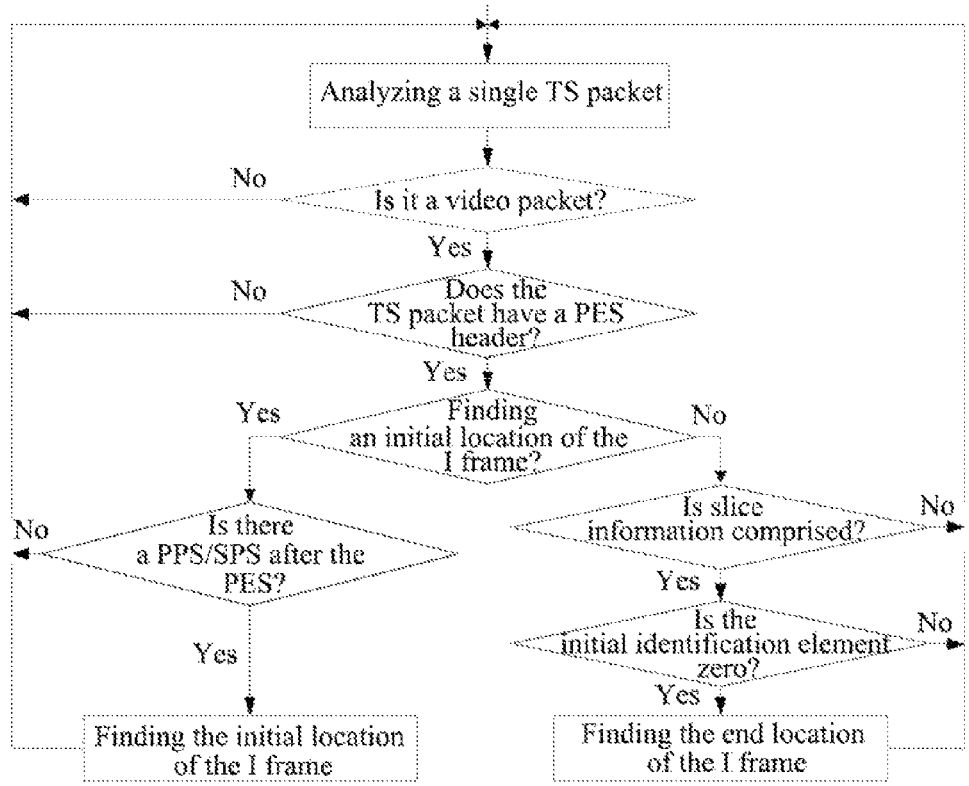
FIG. 2 is a schematic diagram of a specific example of implementing the method for retrieving I frame according to the present invention.

As shown in FIG. 2, a specific flowchart of retrieving an I frame according to the present invention is shown, in which a TS stream is put into a memory after being received, and TS packets are then analyzed one by one. The specific steps for implementing retrieving of I frame are as follows.

In the first step, the TS packets are analyzed one by one, and when each TS packet is analyzed, whether the TS packet is a video packet is determined at first, and if the PID of the current TS packet is a video PID in the TS stream, it is illustrated that the TS packet is a video packet, and go to the second step; otherwise, it is illustrated that the TS packet is not a video packet, and go to the first step to analyze the next TS packet.

In the second step, whether the TS packet comprises a PES header is determined, and if so, go to the third step; otherwise, go to the first step. Specifically, if first three bytes of payload of the current TS packet are initial codes 0x000001 of the PES, it can be determined that the present TS packet comprises PES header information; otherwise, the TS packet does not comprise the PES header information.

In the third step, whether an initial location or an end location of the I frame is to be searched for currently is determined, and if the initial location of the I frame needs to be searched for, go to the fourth step; and if the end location of the I frame needs to be searched for, go to the fifth step.

In the fourth step, the bytes comprised in the PES header are skipped, and whether the subsequent bytes comprise initial codes of the SPS/PPS parameter sets is determined, and if so, it is illustrated that the current TS packet is the initial location of the I frame, and then go to the first step to continue to analyze the next TS packet for searching for the end location of the I frame; and if the initial codes of the SPS/PPS parameter set are not comprised, it is illustrated that the TS packet does not have initial data of the I frame, and go to the first step directly to continue to analyze the next TS packet.

In the fifth step, whether the subsequent data of the PES header in the current TS packet comprises slice information is determined, and if a type of the current NAL is one of a slice of an (Instantaneous Decoder Refresh) IDR image, a slice of a non-IDR image, a SPS and a PPS, it is illustrated that the data after the NAL is the slice header information, and go to the sixth step; otherwise, got to the first step.

In the sixth step, whether the value of the first_mb_in_slice syntax element in the current slice information is zero is determined, and if the value of the first_mb_in_slice syntax element is zero, it is illustrated that the first macro block of the slice is the first macro block of the present frame image, which further illustrates that the slice is initial data of the present frame image, i.e., an initial location of a new frame is found, then the previous TS packet can be determined to be the end location of the I frame, and after the determination of the end location, go to the first step to continue to analyze the next TS packet for searching for the initial location of the next I frame. If the value of the syntax element first_mb_in_slice is not zero, go to the first step directly.

Figure 3:
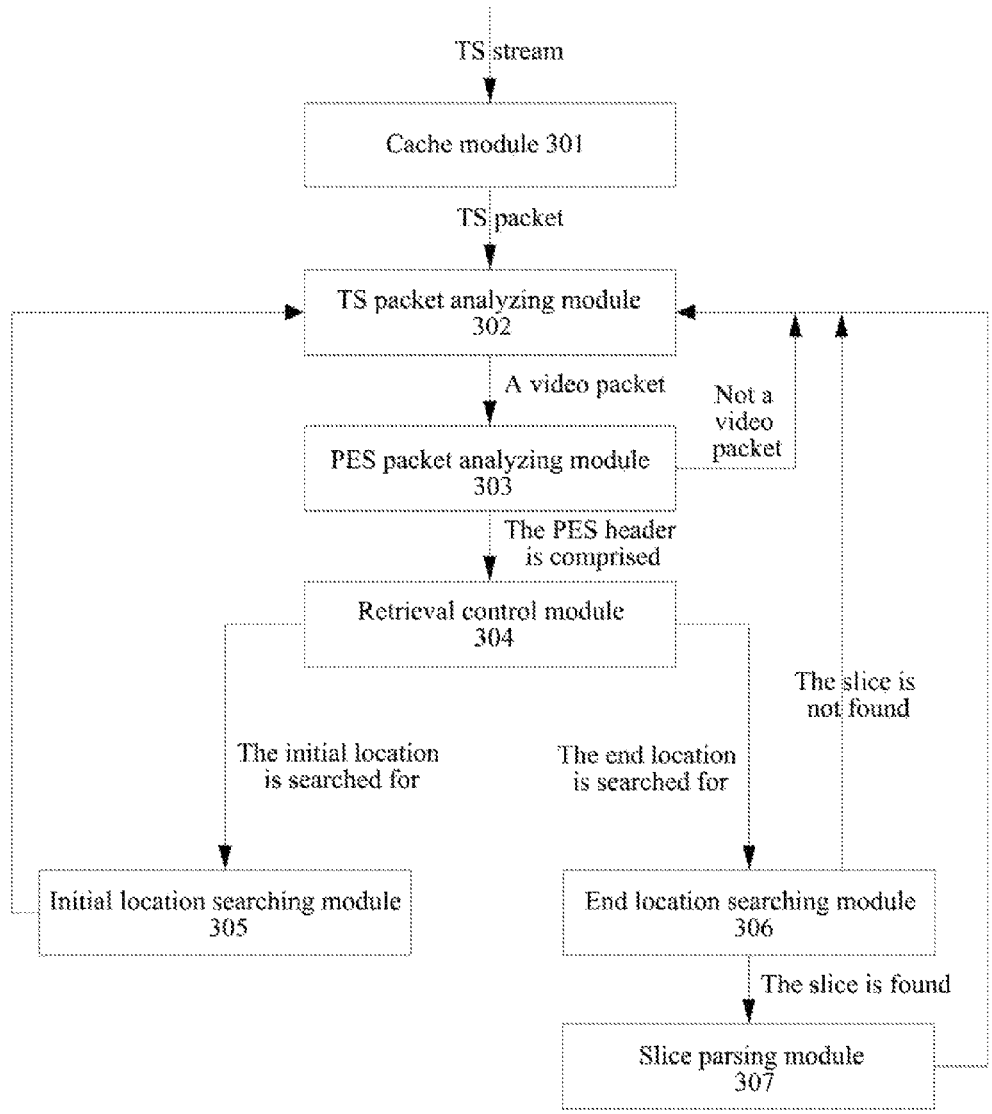
FIG. 3 is a structural block diagram of implementing a retrieval apparatus for retrieving I frame according to the present invention.

A retrieval apparatus for retrieving I frame according to the present invention, as shown in FIG. 3, comprises the following modules.

A cache module 301 is used to cache the received TS stream, and store a number of TS packets.

A TS packet parsing module 302 is used to obtain TS packets from the cache module, analyze the TS packets one by one to determine whether the current TS packet is a video packet, and if so, the TS packet is handed over to a PES packet analyzing module; otherwise, the next TS packet is obtained to continue to be analyzed. When being analyzed, if the PID in the current TS packet is a video PID in the TS stream, it is illustrated that the TS packet is a video packet.

The PES packet analyzing module 303 is used to determine whether the TS packet comprises a PES header, and if so, hand over to a retrieval control module for processing; otherwise, notify the TS packet parsing module to continue to obtain the next TS packet for analyzing. When being determined, if first three bytes of payload of the current TS packet are initial codes 0x000001 of the PES, it can be determined that the present TS packet comprises PES header information.

The retrieval control module 304 is used to determine whether an initial location or an end location of the I frame is searched for, and if the initial location of the I frame needs to be searched for, hand over to an initial location searching module for processing; and if the end location of the I frame needs to be searched for, deliver it to an end location searching module for processing.

The initial location searching module 305 is used to skip the bytes comprised in the PES header, determine whether the bytes after the PES header comprise initial codes of SPS/PPS parameter sets, and if so, it is illustrated that the current TS packet is the initial location of the I frame, and notify the TS packet parsing module to obtain the next TS packet for analyzing, and search for the end location of the I frame; otherwise, notify the TS packet parsing module directly to continue to obtain the next TS packet.

The end location searching module 306 is used to determine whether the bytes after the PES header in the current TS packet comprise slice information, and if a type of a current NAL is one of a slice of an IDR refresh image, a slice of a non-IDR image, a SPS and a PPS, it is illustrated that the data after the NAL is slice information, and hand over to the slice parsing module for processing; otherwise, notify the TS packet parsing module to continue to obtain the next TS packet.

The slice parsing module 307 is used to determine whether a value of a first_mb_in_slice syntax element of the current slice information is zero, and if the value of the first_mb_in_slice syntax element is zero, it is illustrated that the first macro block of the slice is the first macro block of the present frame image, which further illustrates that the slice is initial data of the present frame image, i.e., an initial location of a new frame is found, then the previous TS packet can be determined to be the end location of the I frame, and after the determination of the end location, notify the TS packet parsing module to continue to analyze the next TS packet to search for an initial location of the next I frame. If the value of the syntax element first_mb_in_slice is not zero, notify the TS packet parsing module directly to continue to analyze the next TS packet.

The retrieval apparatus for retrieving I frame according to the present invention can be located at the server side, or can also be located at the terminal side, can be a separate apparatus, or can also be an integral of the server or the set-top box, and is used to retrieve and locate the I frame quickly and accurately irrespective of being at the server side or at the terminal side.

By using the method and apparatus for retrieving an I frame according to the present invention, without parsing syntax elements in H.264, such as a SPS, a PPS, a slice etc., the location of the I frame can be positioned by simply comparing various TS packets in the TS stream and making a determination, thus being able to find the initial and end locations of the I frame and being able to implement retrieving and positioning of the I frame quickly and accurately to provide a rapid response for user-related service applications.

Although the present invention is illustrated in combination with the specific embodiments, modification and changes can be made for those skilled in the art without departing from the spirit or scope of the present invention. Such modifications and variations should be construed as being within the scope of the present invention and the scope of the appended claims.

INDUSTRIAL APPLICABILITY

The present invention provides a method and an apparatus for retrieving I frame. When the I frame is retrieved, without parsing syntax elements in H.264, such as a SPS, a PPS, a slice etc., the location of the I frame can be positioned by simply comparing various TS packets in the TS stream and making a determination, thus being able to find the initial and end locations of the I frame and being able to implement retrieving and positioning of the I frame quickly and accurately to provide a rapid response for user-related service applications.

What we claim is:

1. A method for locating an I frames comprising:
analyzing, by a server or a terminal, transport stream packets in a transport stream one by one, and when one of the transport stream packets is determined to be a video packet and it comprises a Packet Elementary Stream (PES) header, then said server or terminal determining a beginning position of the I frame or an ending position of the I frame based on data after the PES header in said one of the transport stream packets in the way as follows:
when it is determined that bytes after the PES header in said one of the transport stream packets comprise initial codes of a Sequence Parameter Set (SPS) or a Picture Parameter Set (PPS), then said one of the transport stream packets is determined to be the beginning position of the I frame; and
when it is determined that the bytes after the PES header in said one of the transport stream packets comprise slice information and an initial identification element in the slice information is identified as initial data of a present frame image, then a previous transport stream packet of said one of the transport stream packets is determined to be the ending position of the I frame.

2. The method according to claim 1, wherein,
in the step of determining that the current transport stream packet is a video packet, it is determined whether a packet identifier of the current transport stream packet is a video packet identifier in the transport stream, and if so, it is determined that the current transport stream packet is the video packet.

3. The method according to claim 1, wherein,
in the step of determining that the current transport stream packet comprises a PES header, it is determined whether first three bytes of payload of the current transport stream packet are initial codes of the PES, and if so, it is determined that the current transport stream packet comprises a PES header.

4. The method according to claim 1, wherein,
in the step of determining that bytes after the PES header in the current transport stream packet comprise slice information, it is determined whether a type of a current network abstraction level is one of a slice of an instantaneous decoder refresh image, a slice of a non-instantaneous decoder refresh image, a SPS and a PPS in the data after the PES header, and if so, it is determined that the data packet after the PES header comprises the slice information.

5. An apparatus for locating an I frames comprising:
one or more processors; a memory storing instructions that when executed:
obtain transport stream packets in a transport stream, analyze the transport stream packets one by one, and when one of the transport stream packets is determined to be a video packet, and it comprises a Packet Elementary Stream (PES) header, then determine a beginning position of the I frame or an ending position of the I frame based on data after the PES header in said one of the transport stream packets in the way as follows:
when it is determined that bytes after the PES header in said one of the transport stream packets comprise initial codes of a Sequence Parameter Set (SPS) or a Picture Parameter Set (PPS), then said one of the transport stream packets is determined to be the beginning position of the I frame; and
when it is determined that the bytes after the PES header in said one of the transport stream packets comprise slice information and an initial identification element in the slice information is identified as initial data of a present frame image, then a previous transport stream packet of said one of the transport stream packets is determined to be the ending position of the I frame.

6. The apparatus according to claim 5 wherein the instructions also cause the apparatus to:
determine whether a packet identifier of the current transport stream packet is a video packet identifier in the transport stream, and if so, determine that the transport stream packet is a video packet.

7. The apparatus according to claim 6, wherein,
the instructions cause the apparatus to determine whether first three bytes of payload of the current transport stream packet are initial codes of the PES when the transport stream packet is a video packet, and if so, determine that the transport stream packet comprises the PES header.

8. The apparatus according to claim 6, wherein the instructions also cause the apparatus to
cache received transport stream packets in the transport stream to obtain the transport stream packets.

9. The apparatus according to claim 5 wherein the instructions also cause the apparatus to:
determine whether first three bytes of payload of the current transport stream packet are initial codes of the PES when the transport stream packet is a video packet, and if so, determine that the transport stream packet comprises the PES header.

10. The apparatus according to claim 5 wherein the instructions also cause the apparatus to:
determine whether a type of a current network abstraction level is one of a slice of an instantaneous decoder refresh image, a slice of a non-instantaneous decoder refresh image, a SPS and a PPS in data after the PES header in the current transport stream packet, and if so, determine that the data after the PES header comprises the slice information.

11. The apparatus according to claim 10, wherein the instructions also cause the apparatus to
cache received transport stream packets in the transport stream to obtain the transport stream packets.

12. The apparatus according to claim 5, wherein the instructions also cause the apparatus to
cache received transport stream packets in the transport stream to obtain the transport stream packets.

* * * * *